June 29, 1937. F. P. FOX 2,085,091
WINDOW
Filed Oct. 19, 1935 3 Sheets-Sheet 1

INVENTOR
Frederick P. Fox
BY
Austin + Dix
ATTORNEYS

June 29, 1937.  F. P. FOX  2,085,091
WINDOW
Filed Oct. 19, 1935  3 Sheets-Sheet 2

INVENTOR
Frederick P. Fox
BY
ATTORNEYS

June 29, 1937.  F. P. FOX  2,085,091
WINDOW
Filed Oct. 19, 1935   3 Sheets-Sheet 3

INVENTOR
Frederick P. Fox
BY
Austin + Dix
ATTORNEYS

Patented June 29, 1937

2,085,091

UNITED STATES PATENT OFFICE 2,085,091

WINDOW

Frederick P. Fox, Scarsdale, N. Y.

Application October 19, 1935, Serial No. 45,719

5 Claims. (Cl. 47—40)

This invention relates to a novel type of decorative device, and more particularly, to a new type of conservatory situated in an opening formed in the outside wall of a room and preferably constructed so that it can be turned to face the plants either toward the interior of the room or toward the outside, without disturbing the arrangement of the plants on a base which carries them.

It has been proposed to attach a conservatory to the window of a room so that it hangs outside of the plane of the window, but such constructions have been not only awkward to handle but unsightly in appearance, requiring a complete rearrangement of the individual plants or flowers in order to secure variety, or the complete removal of cumbersome frames.

A feature of the present invention accordingly resides in providing a device of the character indicated which can be readily assembled with an opening in the outside wall of a room, and which is adapted to receive flowers, plants, or the like, and to be readily rotated or shifted into different positions for exposing different sides of decorations to the room and to the outside, all without the need for disturbing an artistic or attractive arrangement of the plants or flowers with respect to one another.

A more specific and preferred feature of the present invention resides in providing such a device which is rotatable on a pivot and which is at one and the same time reasonably simple and inexpensive to build, attractive in appearance, and weatherproof.

Still another feature of the invention lies in the provision of a conservatory in a bay window, the portion of the conservatory in which the plants are housed being rotatable, and the construction being such as to enable rotation at any time without complicated adjustments, affording a weather tight arrangement, and being capable of admitting such air and moisture as the plants may require.

Other features, objects and advantages of the present invention will in part be pointed out and in part become apparent in connection with the following detailed description of certain forms of construction in accordance with the present improvement, reference being had to the accompanying drawings, wherein.

Figure 2:
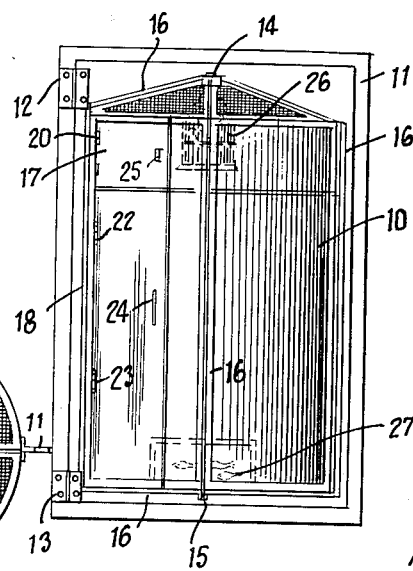
Fig. 2 is a central vertical section taken through a modified form of construction.
Figure 4:
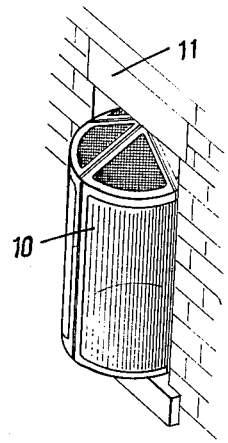
Fig. 4 is a perspective view, on reduced scale, of the device shown in Figs. 2 and 3, assembled with a wall opening.
Figure 3:
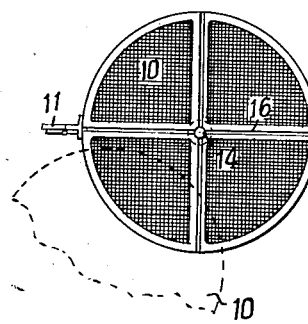
Fig. 3 is a plan view of the top of the construction shown in Fig. 2.

Referring first to Figs. 2, 3, and 4, there is shown a frame 11 set into a wall in any suitable manner, and carrying therewith through hinges 12 and 13 a suitable container 10 pivoted on a vertical rod 14 supported on pivot 15. An inner frame 18 is carried by the hinges 12, 13 so that while the container 10 may rotate the inner frame 18 may swing on the hinges. The inner frame 18 is of any convenient shape and may or may not closely surround the container 10, which latter may be formed of suitable metal and glass construction having a wire mesh top, if desired, to admit air and moisture to the interior of the container. The container 10 may be made in sections and some of the sections may be hinged as at 22, 23 for opening to permit plants to be inserted. A latch, indicated diagrammatically at 20, may be provided, if desired, and slots or other openings 24 and 25 may be included to cooperate with the screens in the top to allow air movement within or through the container. A bird cage 26 and a fish bowl 27 may be added in case a touch of animal life is wanted. The fish bowl always operates to provide moisture for the plants. In the metal construction part of the container, joints 16 are provided for receiving the glass or screen or other construction.

Figure 1:
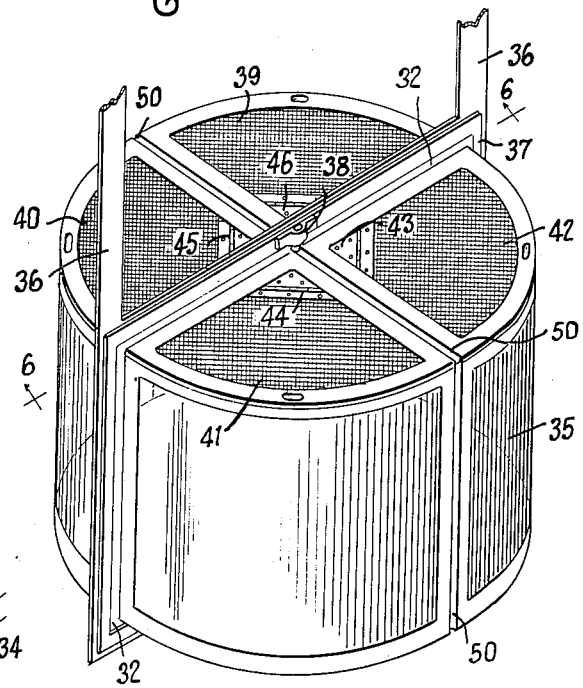
Fig. 1 is a perspective view of one form of construction.
Figure 5:
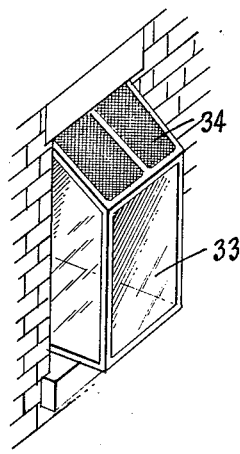
Fig. 5 is a perspective view of a modified form of device.
Figure 6:
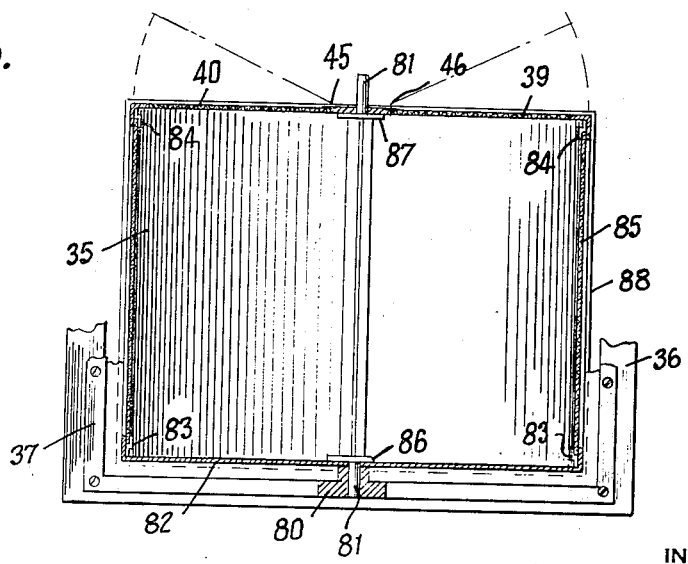
Fig. 6 is a vertical section taken on the line 6—6 of Fig. 1, looking in the direction of the arrows.

Referring now to Figs. 1 and 6, there is shown a modified form of construction in which the container designated in these figures as 35 is somewhat fore-shortened. It is carried by supports 36, of any suitable shape, having a rectangular frame 37 secured thereto for receiving a rubber or other flexible weather stripping material 32 adapted to surround the container and flex into grooves 50. The container may have a screen 39 in the top and may be pivoted as at 38, having a suitable number of trap doors 43 and 46, hinged at 44 and 45.

The upper part of the frame may receive a glass pane or the like, and the side walls of the container are also preferably of glass. When the container is revolved, the rubber flaps into grooves 50 making the device watertight, since the rubber and grooves are applied to top and bottom of the container as well as at the sides.

In Fig. 6, certain details are shown, to wit, a pivot block 80, rod 81, rotatable base 82, corner brackets 83, 84, glass panels 85, washers 86, 87 and metal frame pieces 88. These details may vary as will be apparent to metal workers and builders.

Figure 7:
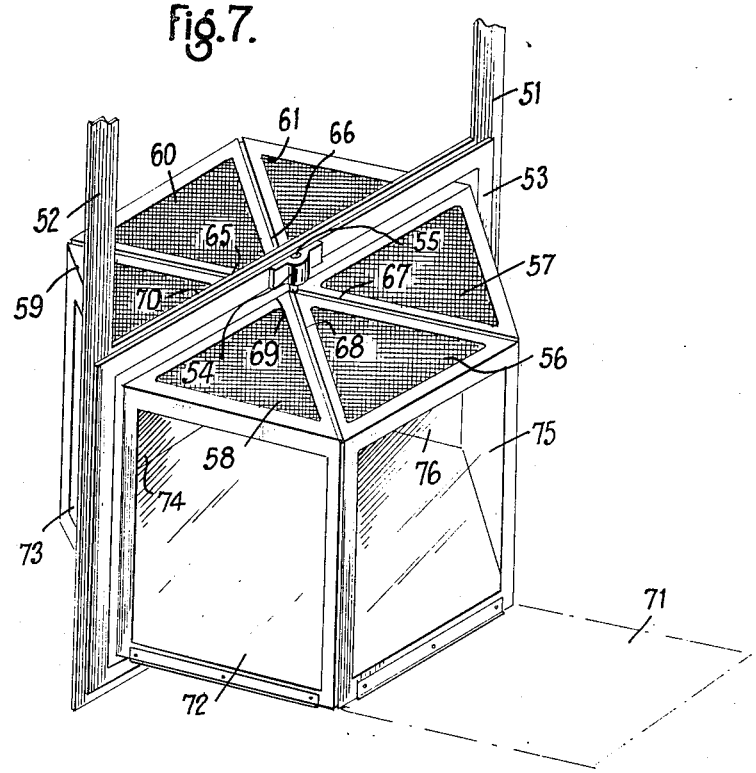
Fig. 7 is a modified form of the construction shown in Fig. 1.

In Fig. 7 the device is hexagonal instead of circular, though otherwise just like Fig. 1. It will be understood that the shape might be quadrilateral or any other shape having an even number of corners for engaging the weather stripping.

As in Fig. 1, standards 51, 52 support frame 53 and in turn box having panels 71—76, one or more of which is hinged for opening. Rod 54 is carried in pivot 55 for supporting the unit for rotation. Suitable screens may be used where required, as at 56—61. Grooves 65—69 are used as above described.

Figure 8:
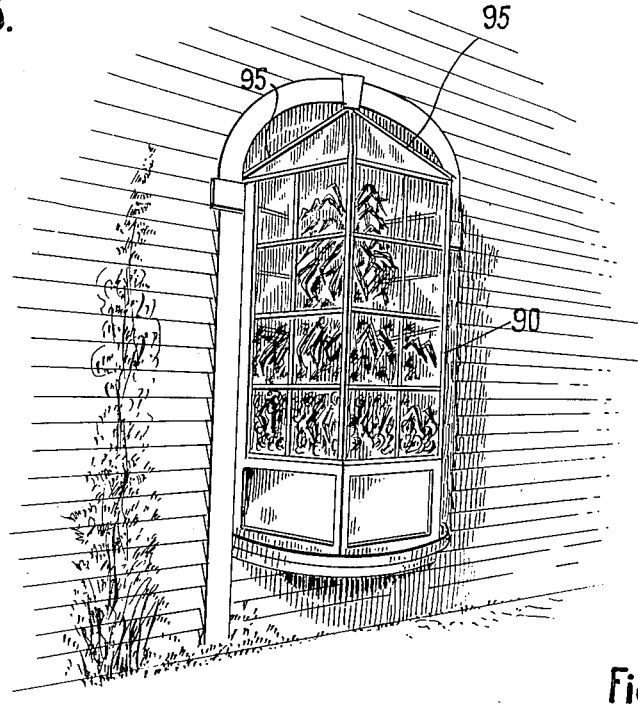
Fig. 8 is a perspective view of a preferred form of the invention.
Figure 9:
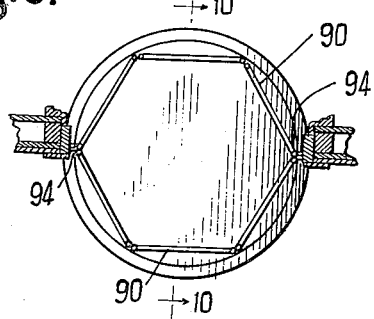
Fig. 9 is a horizontal section taken through the upper portion of Fig. 8.
Figure 10:
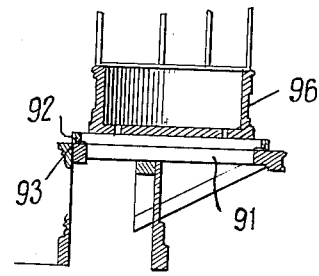
Fig. 10 is a vertical section taken on the lines 10—10 of Fig. 9.

Referring to Figs. 8–10, there is shown a closed, hexagonal bay window 90, mounted on a floor 91 which is preferably open in the center and supported in any convenient manner on the building. This floor 91 may be closed in the center for various types of structures. The entire bay window is mounted on a circular, U-shaped device 92 which overlies flange 93 and thus makes the bottom weather-tight. The side edges 94 may be weather-proofed, as previously described, and so may the top edges 95. The base of the bay window may be of a box form 96 of any convenient type. If desired the box form may be constructed to support parts of the closed window and to receive dirt for the plants to grow in. It is desired that the box form 96 shall fit or overlie the device 92. In the form shown in Figs. 8, 9, and 10 the whole window rotates.

Figure 11:
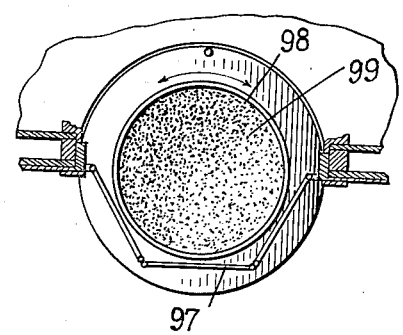
Fig. 11 is a horizontal section through the lower portion of a modification of the construction shown in Figs. 8-10.

In Fig. 11 the bay window 97 is open at the inside, and a turn table 98 is constructed so as to extend into the room beyond the inner edge of the window. The bottoms of panels 97 may have rubber or the like attached to bear against the turntable and keep water out. A container 99, smaller than the window, is mounted on the turntable within the window and rotates with the former. The container thus lies partly within and partly without the building line.

It will thus be appreciated that there is provided a simple, inexpensive, decorative, rotatable, bay-window conservatory which enables plants, flowers, or the like, to be turned so as to face in different directions, with part of the conservatory inside and part outside of the wall of the building, all without the need for individually rearranging the plants or flowers, and without sending for the handyman about the place to accomplish the change.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. In a bay window having a glass lying outside the building wall, a rotatable platform lying close to said glass and partly outside the building, a container for plants and the like, and means to weather-proof the construction.

2. In a bay window construction, a closed polygonal, glass conservatory, means to support the same for rotation partly inside and partly outside the building wall, and means to weatherproof the conservatory with respect to the walls of the building.

3. A conservatory comprising a container having glass walls, means to mount said container partly inside and partly outside a building wall, means to enable said container to be rotated, and grooves and cooperating flexible strips carried by said container and cooperating portions of the construction for weather-proofing the same.

4. A conservatory adapted to receive plants or the like comprising, a frame adapted to be permanently placed in a window, a conservatory structure pivotally mounted on said frame and having a weather-proof contact with said frame, said conservatory being enclosed and having parts thereof which extend into a room on the room side of said frame and parts thereof extending outside of said frame and exterior of the building line, said conservatory being constructed to move in its assembly so that the part thereof extending outside of the building line may be moved into the room and the room part of the conservatory moved to a position outside of the building line of the window.

5. A conservatory adapted to receive plants or the like comprising, a window frame structure permanently fastened in a window, a second frame pivotally attached to the first frame and having weather-proof engagement therewith, and a conservatory mounted in the second frame in weather-proof relation therewith, said conservatory being pivotally mounted so as to rotate in said second frame and thereby allow the plants mounted in said conservatory to be moved exterior of the frame and outside of the building line of a house in which the conservatory is mounted and allow other of the plants to be moved to the interior of the house in which the frame is mounted.

FREDERICK P. FOX.